July 6, 1965 R. Y. BOVEE 3,192,859
FLUID TRANSMISSION AND CONTROL
Filed Jan. 27, 1961 11 Sheets-Sheet 1
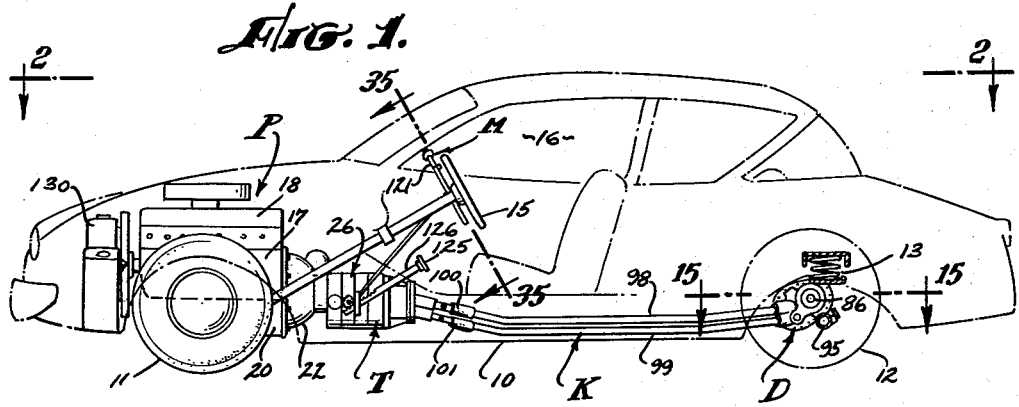
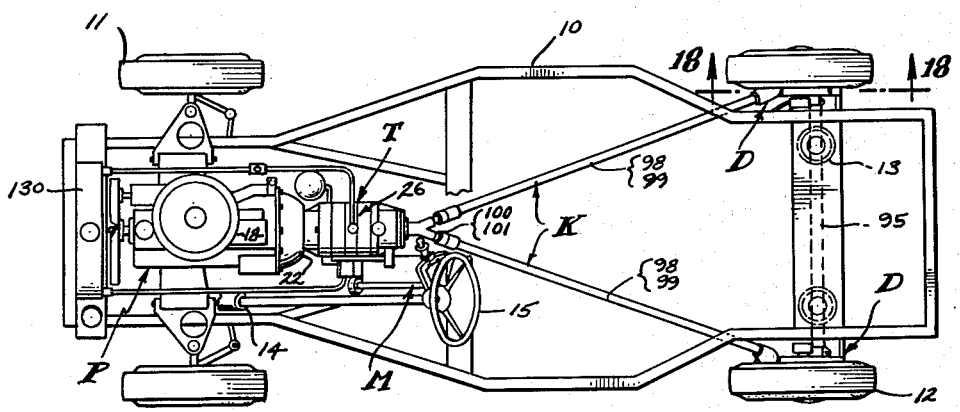
INVENTOR.
Ransom Y. Bovee,
BY
W. H. Maxwell
AGENT.

July 6, 1965 R. Y. BOVEE 3,192,859
FLUID TRANSMISSION AND CONTROL
Filed Jan. 27, 1961 11 Sheets-Sheet 2
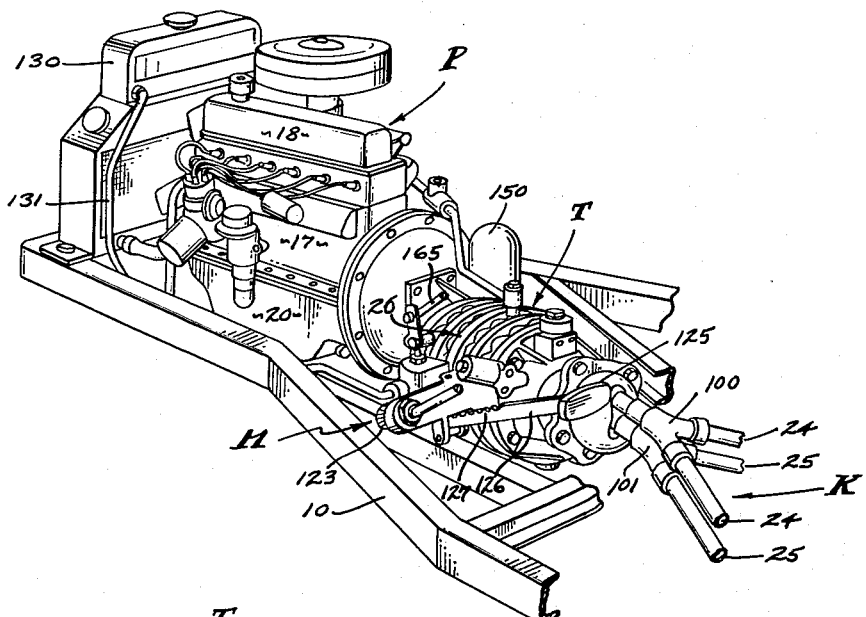
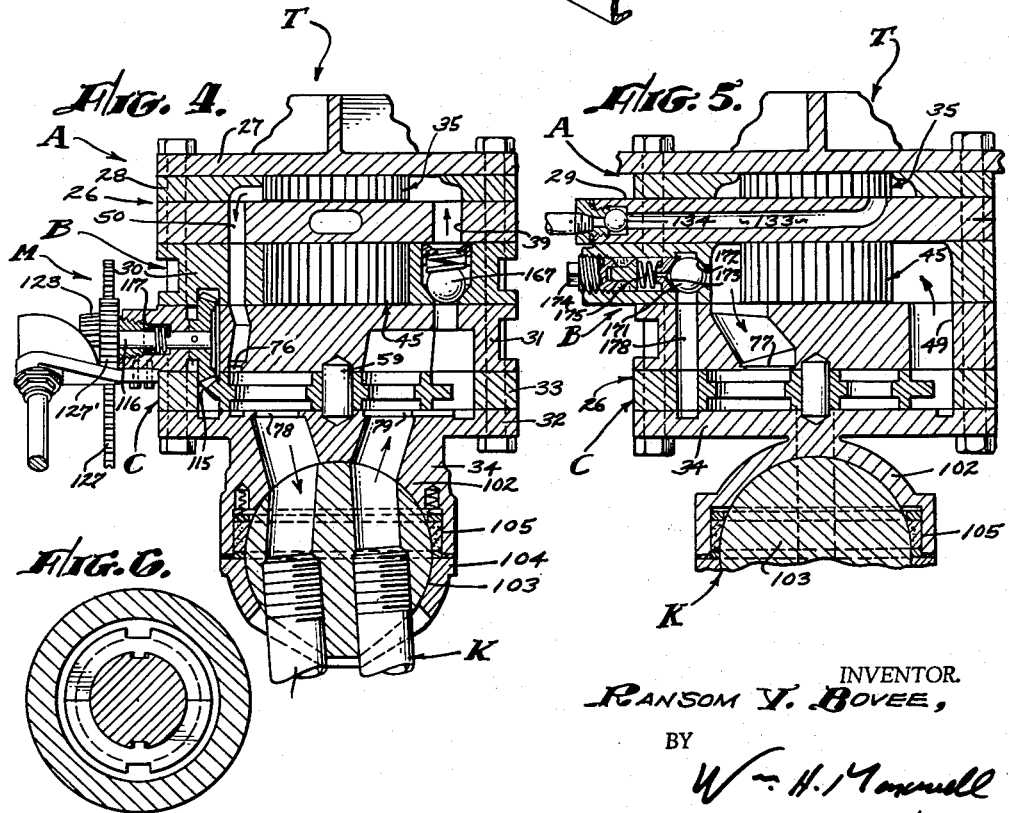
INVENTOR.
RANSOM Y. BOVEE,
BY
Wm. H. Maxwell
AGENT.

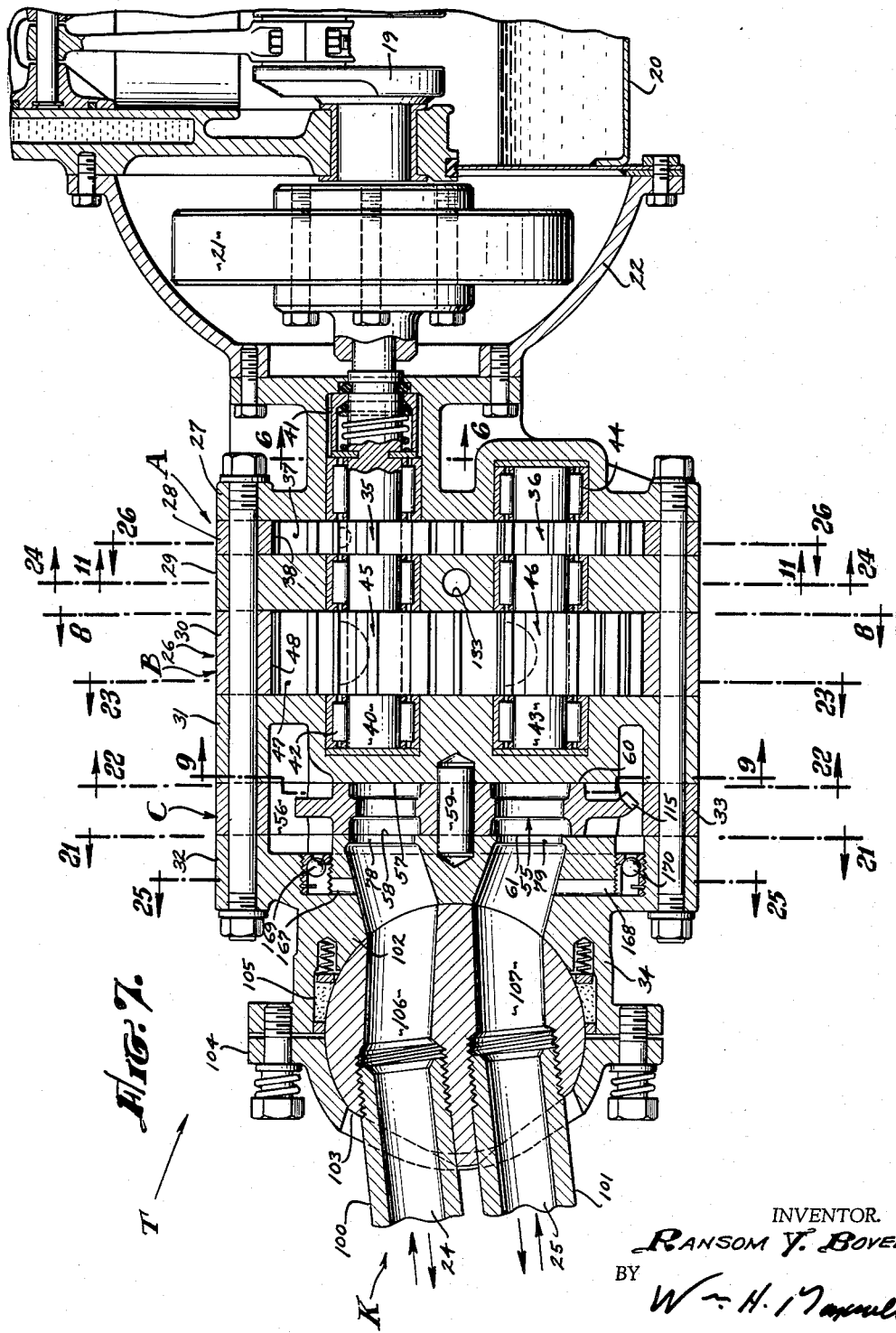

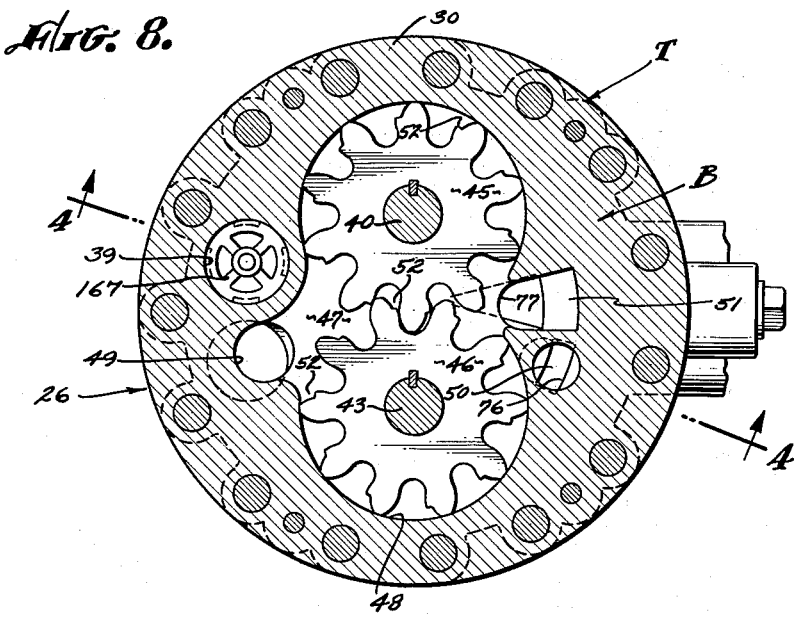
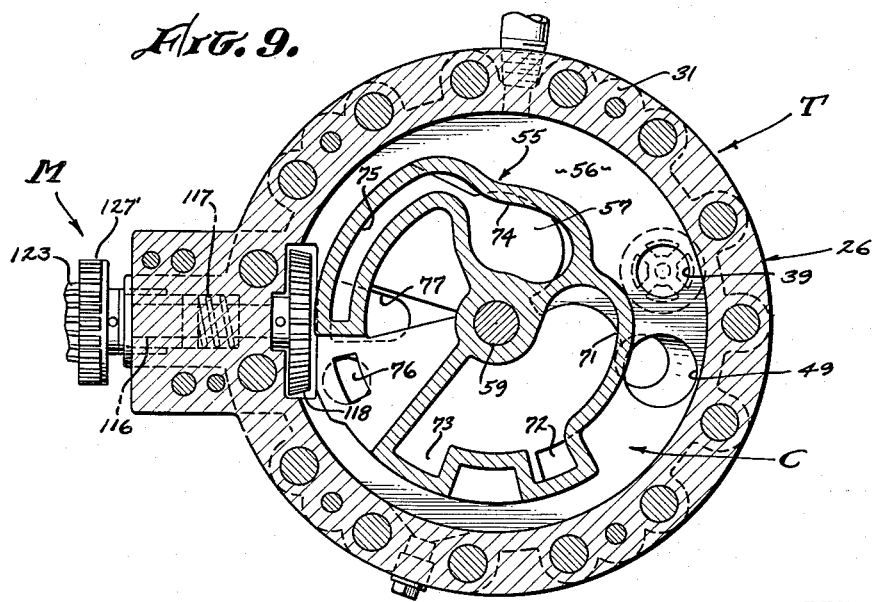

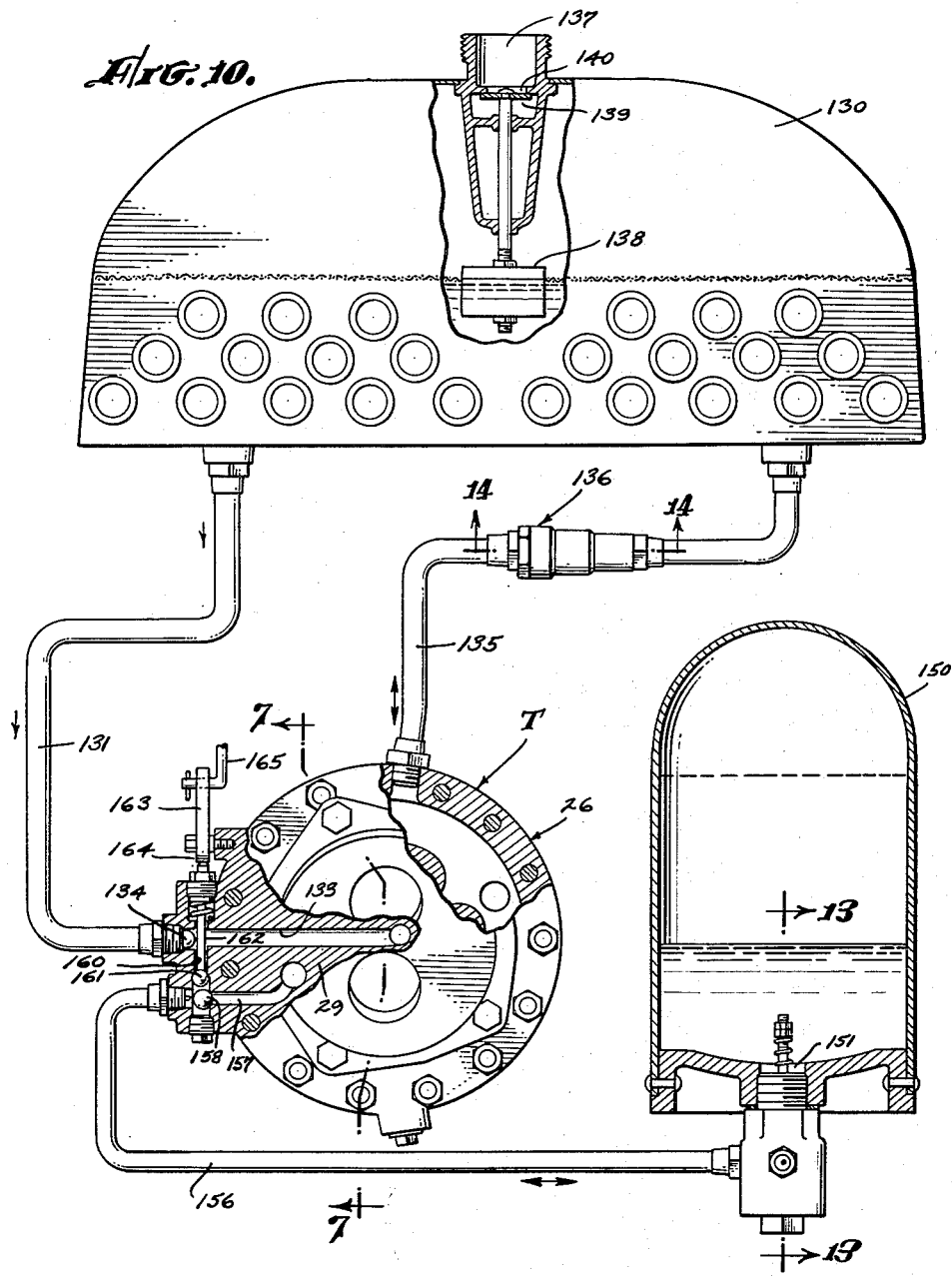

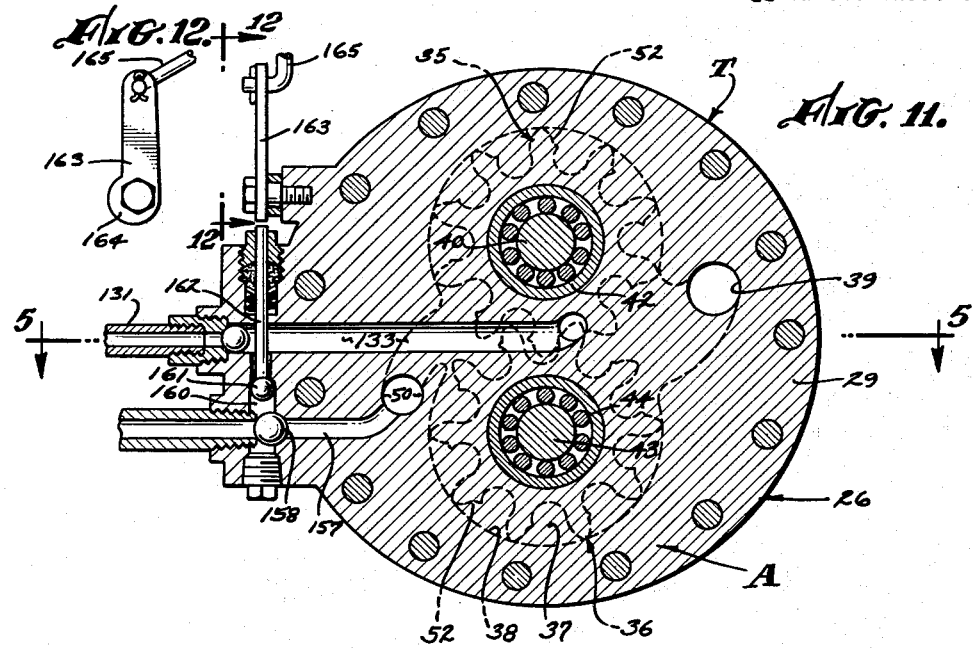
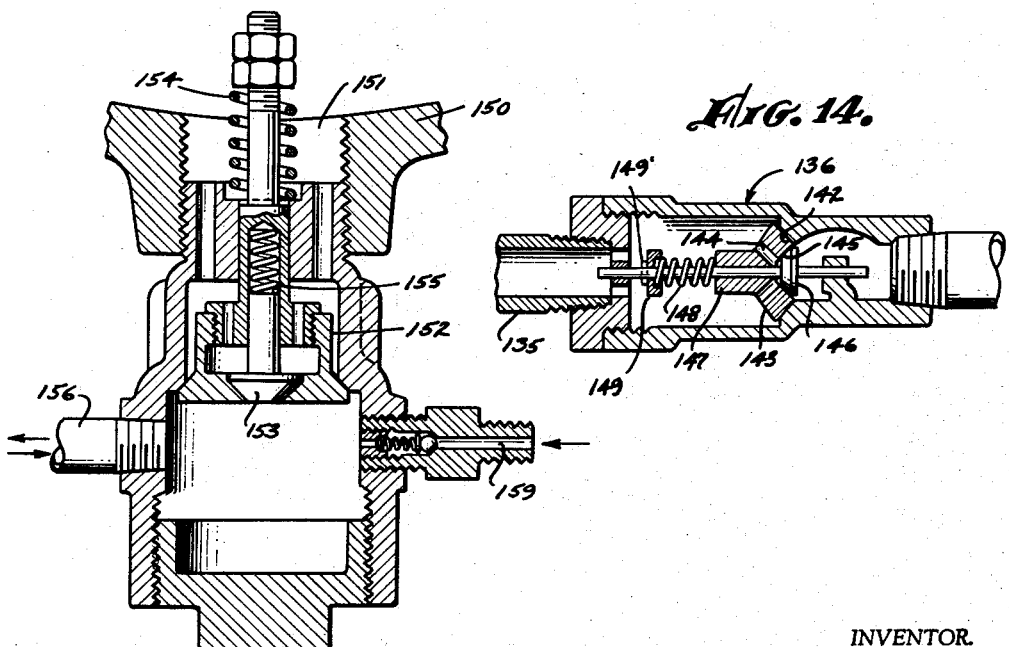

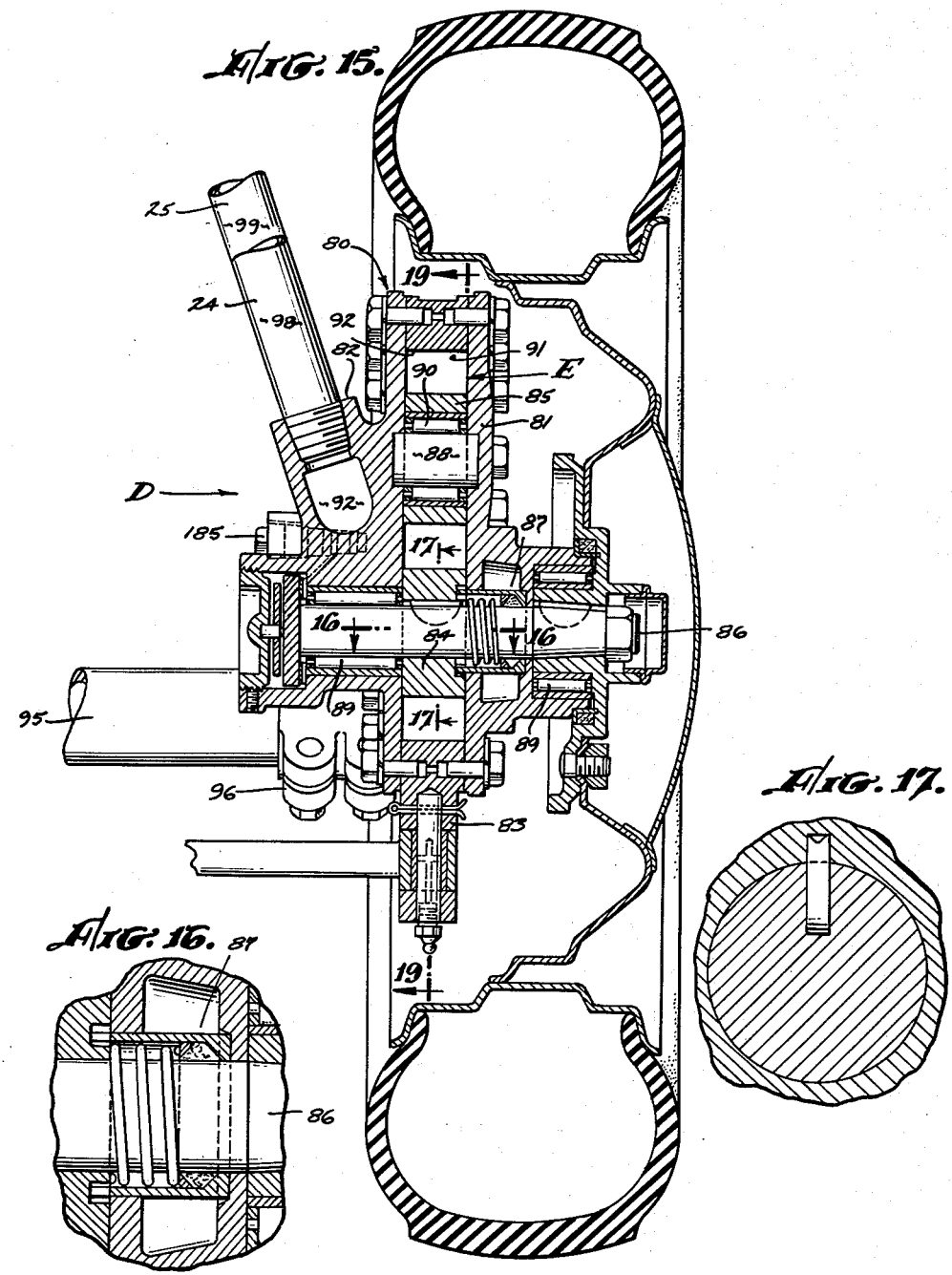

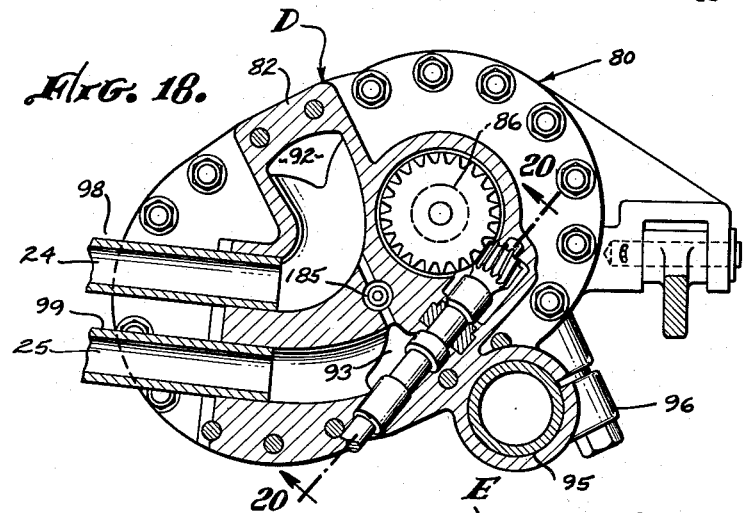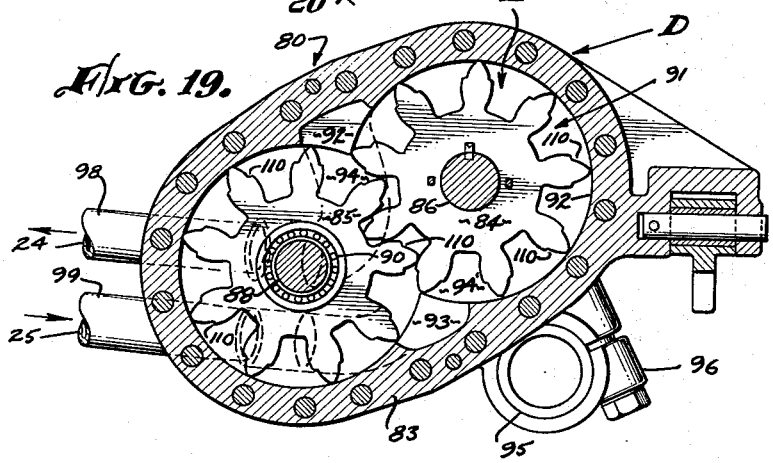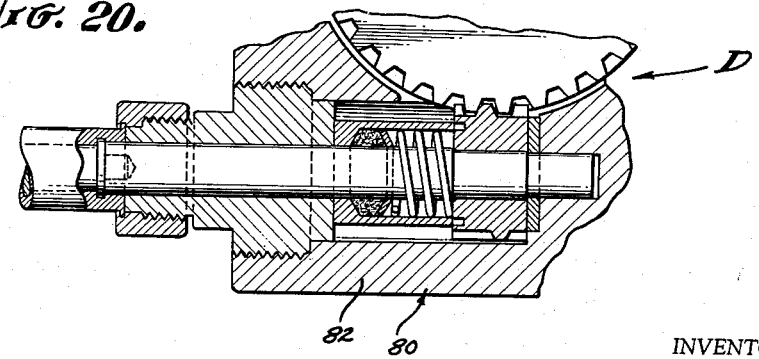

July 6, 1965 R. Y. BOVEE 3,192,859
FLUID TRANSMISSION AND CONTROL
Filed Jan. 27, 1961 11 Sheets-Sheet 9
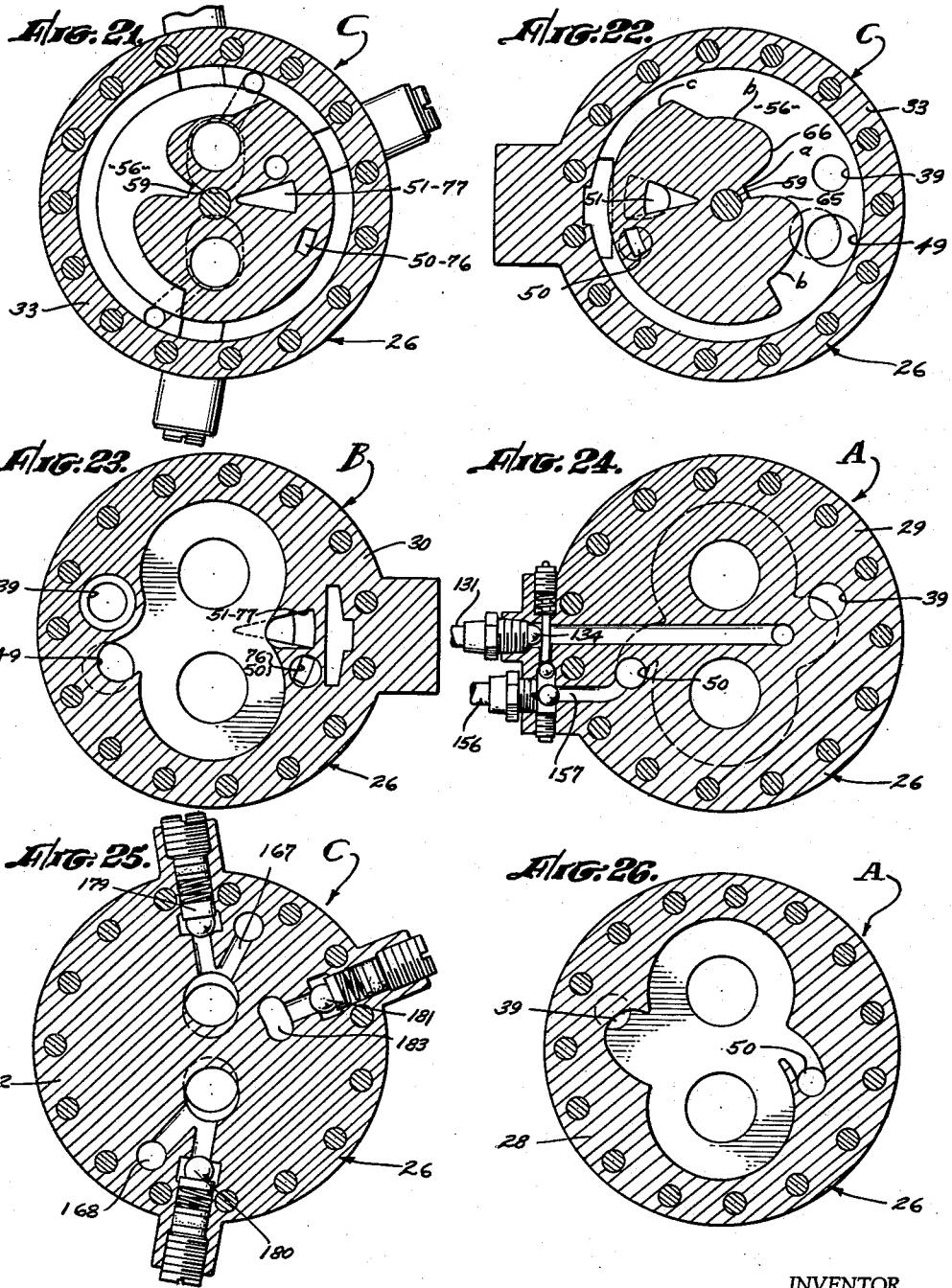
INVENTOR.
RANSOM Y. BOVEE,
BY
W. H. Maxwell
AGENT.

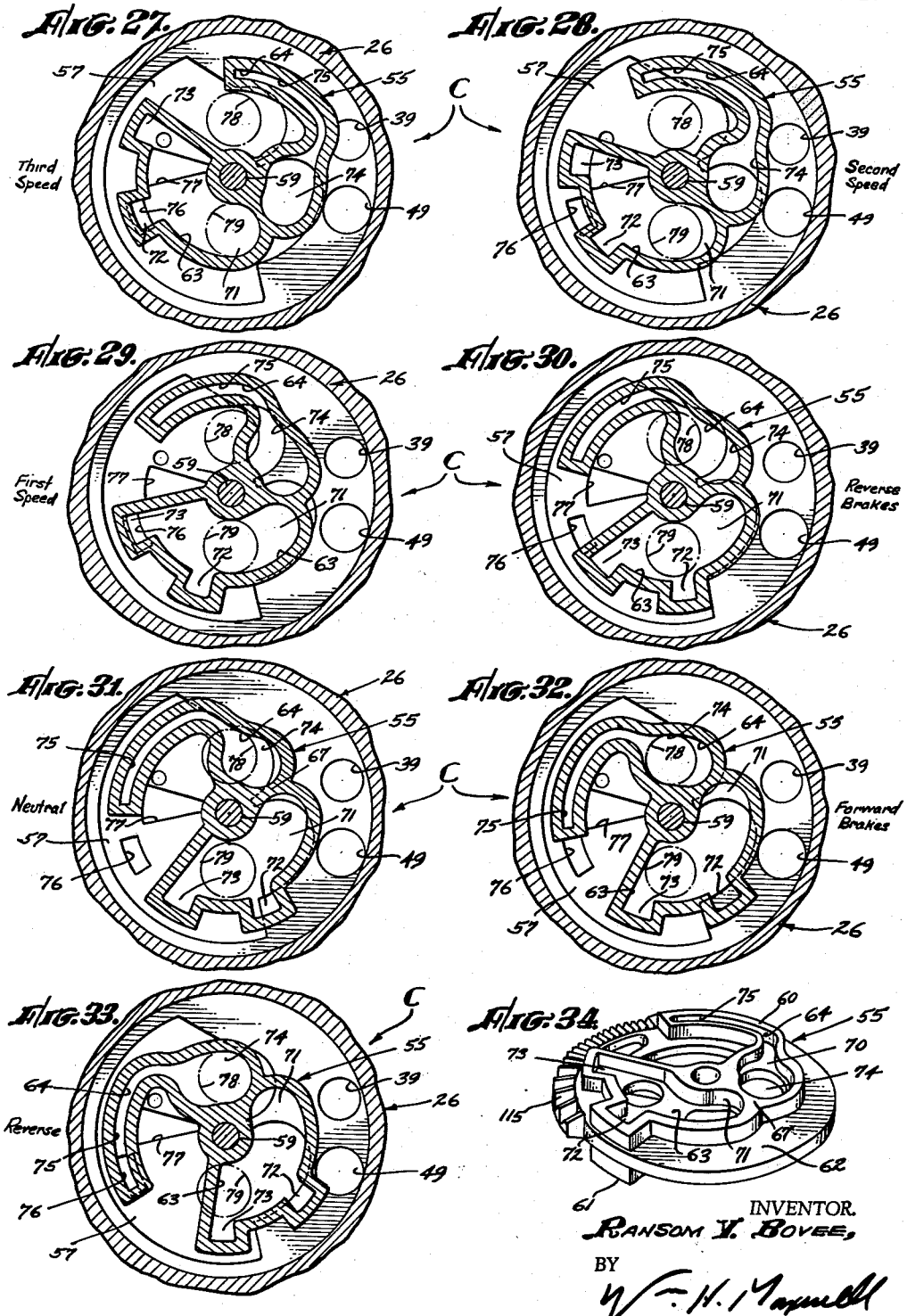

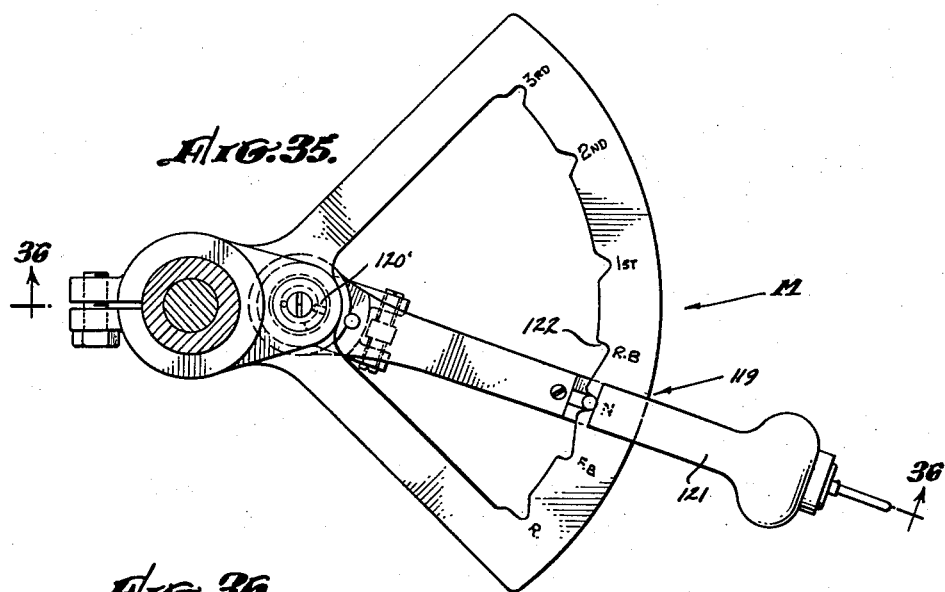
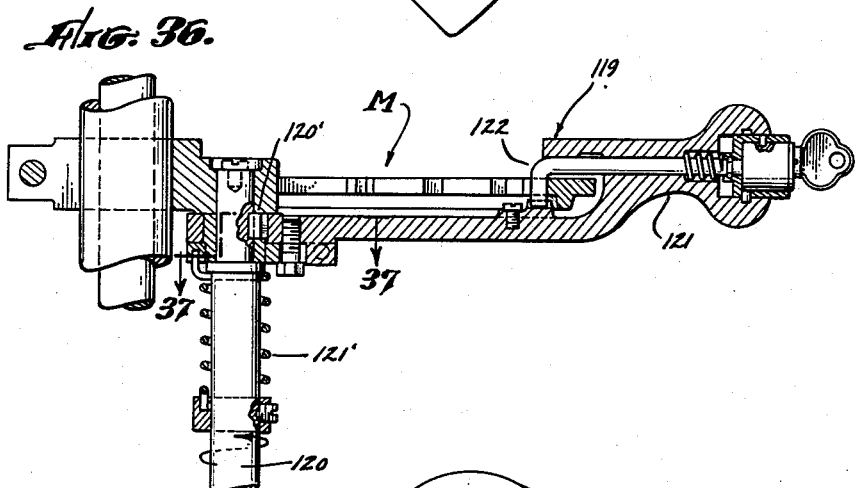
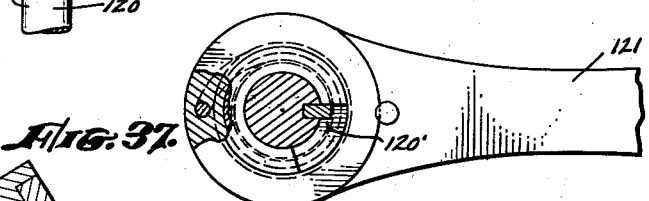
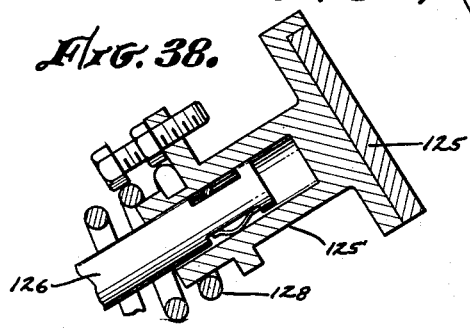
INVENTOR.
Ransom Y. Bovee,
BY
W. H. Maxwell
AGENT.

United States Patent Office 3,192,859
Patented July 6, 1965

3,192,859
FLUID TRANSMISSION AND CONTROL
Ransom Y. Bovee, Sepulveda, Calif., assignor to Monovalve Motors Corporation, Los Angeles, Calif., a corporation of California
Filed Jan. 27, 1961, Ser. No. 85,387
21 Claims. (Cl. 103—11)

This invention relates to a fluid transmission and control and is particularly concerned with a drive and brake for vehicles, it being a general object of this invention to transmit torque from a prime mover to the wheels of a vehicle and also to transmit torque from the said wheels to restrictive means. Thus, the present invention deals generally with the drive of a vehicle, or the like, to accelerate, maintain speed, and to decelerate said vehicle.

Heretofore, various types of automotive transmissions have been employed with varying degrees of success and failure. For the most part, every transmission has had its advantages and disadvantages, for example, direct gear drives involve the application of engaging and disengaging teeth or clutches, and said engagements and disengagements involve rather complex controls. Further, because of the directness of mechanical connection, buffer means in the form of fluid couplings are resorted to, a further refinement being to employ fluid couplings having variable torque transmitting capabilities. In any case, however, the characteristic of the ordinary transmission is to include speed changing gear drives and without any real consideration to the braking for deceleration of the vehicle.

An object of this invention is to provide torque transmitting and control means that is applicable, generally, to vehicles and the like, and which delivers torque from a prime mover to the drive wheels of the vehicle, and which also restricts the torque of said wheels in order to effect deceleration and braking of said vehicle.

An object of this invention is to provide a power transmission for applying torque to and taking it from the drive wheels of a vehicle and that transmits resulting thrusts into the vehicle body to the principal mass thereof which is forward of the center of gravity of the vehicle, and thereby minimizing undesirable pivotal movements ordinarily due to excessive rear-mass inertia. That is, rear-mass is minimized and thrust is exerted against the vehicle at a point substantially forward of the center of gravity.

An object of this invention is to provide a vehicle transmission and braking unit that is adapted to be fixedly mounted in the vehicle and which applies torque to and takes it from the drive wheels while allowing for movement of said wheels independent of the vehicle frame and also independently of each other.

An object of this invention is to provide a transmission of the character referred to that operates through hydraulics alone in order to couple a prime mover to the drive wheels and also to restrict turning of said drive wheels.

An object of this invention is to provide a transmission of the character referred to that maintains the fluid therein, preferably a hydraulic fluid, and which fluid is automatically supplied and withdrawn from the system in order to cope with all circumstances that may arise, for example to maintain the system full of fluid.

An object of this invention is to provide a transmission of the character referred to that includes starting means to activate the prime mover, said prime mover being shown as an internal combustion engine that requires application of torque for initiating operation thereof.

An object of this invention is to provide a transmission of the character referred to that has improved hydraulic fluid pressuring and moving means. More specifically, the present invention provides a gear type pump or motor for hydraulic fluids which by improved means eliminates fluid pressure-pocket-traps, to the end that the pump or motor provides minimum rolling contact resistance with smooth uninterrupted flow of fluid.

An object of this invention is to provide a transmission of the character referred to that has selectively variable speed ratio outputs, and which advantageously utilizes a plurality of fluid pumps, preferably two of such pumps, each of different volumetric output. This particular transmission involves the use of two simultaneously and continuously driven pumps and a valve control means that selectively utilizes the delivery of said pumps.

An object of this invention is to provide a transmission that involves a manually positionable valving means to selectively employ and combine volumetric output of the above mentioned pumps and for example, to have sequentially, a third speed position; a second speed position; a first speed position; a reverse braking position; a neutral position; a forward braking position; and a reverse position.

An object of this invention is to provide a transmission that has improved fluid driven motors for operating or being operated by, the vehicle drive wheels. More specifically, the present invention provides a motor for hydraulic fluid operation which is of the gear type but which eliminates fluid pressure-pocket-traps, to the end that the motor provides minimum rolling contact resistance with smoothness of operation, either in the forward or backward direction of rotation.

In addition to the foregoing objectives, it is another object of this invention to provide a transmission wherein the conventional differential gearing becomes unnecessary, differential fluid flow being inherent in the present invention.

Also, it is an object to provide a transmission of the character referred to that includes pressure relief bypass means in connection with the fluid channeled in the various speed positions, and also in connection with the two braking positions, and as well as in connection with the motor units.

Another object of this invention is to provide a transmission and control that has conveniently operable and inherently safe manually engageable control elements adapted for hand and/or foot actuation.

The various objects and features of this invention will be fully understood from the following detailed description of the typical preferred form and application thereof, throughout which description reference is made to the accompanying drawings, in which:

FIG. 1 is a side elevation of a motor vehicle embodying the transmission and control of the present invention. FIG. 2 is a plan view taken as indicated by line 2—2 on FIG. 1. FIG. 3 is a perspective view showing the transmission control unit as it is related to the prime mover. FIG. 4 is a sectional view taken substantially as indicated by line 4—4 on FIG. 8. FIG. 5 is a sectional view taken as indicated by line 5—5 on FIG. 11. FIG. 6 is a detailed view taken as indicated by line 6—6 on FIG. 7. FIG. 7 is an enlarged detailed sectional view taken as indicated by line 7—7 on FIG. 10. FIG. 8 is a sectional view taken as indicated by line 8—8 on FIG. 7. FIG. 9 is a sectional view taken as indicated by line 9—9 on FIG. 7. FIG. 10 is an enlarged detailed view with portions broken away and showing circulation of fluid. FIG. 11 is a sectional view taken as indicated by line 11—11 on FIG. 7. FIG. 12 is a detail view taken as indicated by line 12—12 on FIG. 11. FIG. 13 is a detailed sectional view taken as indicated by line 13—13 on FIG. 10. FIG. 14 is a detailed sectional view taken as indicated by line 14—14 on FIG. 10. FIG. 15 is an enlarged detailed section indicated by line 15—15 on FIG. 1. FIG. 16 is a detailed sectional view as indicated by line 16—16 on FIG. 15. FIG. 17 is a detailed sectional view taken as indicated by line 17—17 on FIG. 15. FIG. 18 is a sectional view taken as indicated by line 18—18 on FIG. 2. FIG. 19 is a sectional view taken as indicated by line 19—19 on FIG. 15. FIG. 20 is a sectional view taken as indicated by line 20—20 on FIG. 18. FIG. 21 is a sectional view taken as indicated by line 21—21 on FIG. 7. FIG. 22 is a sectional view taken as indicated by line 22—22 on FIG. 7. FIG. 23 is a sectional view taken as indicated by line 23—23 on FIG. 7, and with parts omitted. FIG. 24 is a sectional view taken as indicated by line 24—24 on FIG. 7, and with parts omitted. FIG. 25 is a sectional view taken as indicated by line 25—25 on FIG. 7. FIG. 26 is a sectional view taken as indicated by line 26—26 on FIG. 7, and with parts omitted. FIGS. 27 to 33 are diagrammatic views partly in section, illustrating the different positions of the fluid controlling valve for producing the different effects and the manner in which the circulation of the fluid is controlled. FIG. 34 is a detailed perspective view of the fluid controlling valve. FIG. 35 is a sectional view taken as indicated by line 35—35 on FIG. 1. FIG. 36 is a sectional view taken as indicated by line 36—36 on FIG. 35. FIG. 37 is an enlarged detailed section taken as indicated by line 37—37 on FIG. 36, and FIG. 38 is an enlarged detailed view of the foot pedal shown in FIG. 1.

The present invention has particular usefulness in its application to motor vehicles wherein the prime mover is continuously operated at variable work outputs while imparting torque and rotational velocity in various ratios to the wheels. Furthermore, it has usefulness in retarding forward and/or backward motion of the moving vehicle by selective and varying control and restriction of rotation of the vehicle's wheels. Therefore, this invention will be described as it is applicable to a motor vehicle, preferably a passenger automobile, and which involves a body and chassis 10 with steerable front wheels 11 and driveable rear wheels 12. The wheels 11 and 12 are provided in pairs and are equipped with pneumatic tires, the chassis 10 having suitable running gear for the suspension of the body and chassis 10 from said wheels 11 and 12. For example, there are springs 13 and a steering gear 14 with a wheel 15 manually operable within a passenger compartment 16. It will be readily understood that the automotive vehicle, as shown, can be equipped as circumstances require.

The vehicle requires a power plant for its propulsion and therefore a prime mover P is provided and which can vary as required. The prime mover P is shown as a typical internal combustion engine, for example, a gasoline powered heat engine having a block 17 and head 18 incorporating a plurality of cylinders in which pistons reciprocate in order to turn a crank 19 through connecting rods. The said crank 19 is housed in a crankcase 20 that encloses the engine, and said crank 19 projects from the block 17 and case 20 where it carries a flywheel 21. The flywheel 21 is enclosed within a housing 22, said housing 22 being opened rearwardly, as is common practice, to receive and mount a transmission unit as hereinafter described and which is coupled to the said flywheel 21.

As best illustrated in FIG. 3 of the drawings the fluid transmission and control of the present invention involves a transmission and control unit T. As shown in FIGS. 1 and 2 of the drawings said unit T is operably connected to the rear drive wheels 12 where there is a driven unit D. In accordance with the preferred form of the invention there is a separate driven unit D at each rear wheel 12 and each driven unit is coupled to the transmission and control unit T through a pair of fluid conducting tubes 24 and 25. The said tubes 24 and 25 can be integrally formed together as by extrusion but are separately shown for clarity. And, they are rigid members for structural purposes, as later described.

The transmission and control unit T is operable through the medium of a fluid, preferably a noncompressible fluid such as hydraulic oil of substantially light weight and/or viscosity. The unit T is preferably a compact and integrated device that is adapted to be mounted on and carried by the prime mover P to be driven thereby and also to drive or actuate said prime mover. To this end, the unit T has a case 26 that is secured to the flywheel housing 22 so that the flywheel 21 can be rotatably coupled to the drive elements of said unit. As shown, the transmission and control unit T is fastened to the prime mover P to project from the rear of the crankcase 20 and flywheel housing 22, and it involves, generally, a low volume fluid pumping means A, a high volume fluid pumping means B, a fluid control means C for governing the movement of fluid, a coupling means K for connecting the unit T to the driven units D at the driving wheels 12 of the vehicle. Furthermore, the transmission and control unit T involves various other means that are cooperatively related to the above mentioned means, and to each other, all as hereinafter described.

The hereinabove specified means A, B, C, and K are preferably combined into a composite unit of cooperatively related parts and elements, although it is to be understood that said means can be formed separately and suitably connected together by hydraulic piping. As shown, the case 26 is sectional, there being a mounting section 27, a low volume pump section 28, a spacer section 29, a high volume pump section 30, a pair of opposed valve control sections 31 and 32, a spacer section 33, and a coupling section 34. The said sections 27–34 can be made in any suitable manner and fabricated for proper spacing and working clearances, and for the passage of fluids as later described.

The two pumping means A and B are alike and are gear type positive displacement pumps, the means A having a driven element 35 and an idler element 36, each with intermeshing teeth, and the means B having a driven element 45 and an idler element 46 each with intermeshing teeth. The driven elements 35 and 45 are keyed to a drive shaft 40 that is directly coupled to the flywheel 21 and which enters the case 26 through a fluid seal 41 in the case section 27. The fluid seal 41 comprises a packing about the shaft 40 and slidably engaged therewith to prevent flow from within the case 26. The corresponding gear elements 35 and 45, and 36 and 46 are of the same diameter and are therefore carried on common shafts. That is, the two driven elements 35 and 45 are keyed to the drive shaft 40 while the two idler elements 36 and 46 are carried, and preferably keyed, to an idler shaft 43 offset from and parallel to the shaft 40. The shaft 40 is suitably journaled in bearings 42 while the shaft 43 is suitably journaled in bearings 44, said bearings being carried in aligned bores in the case sections 27, 29, and 31, respectively. In order for the pumping elements to operate for the purpose of moving fluid and to be moved thereby, they are operated within the closely fitted confines of chambers 37 and 47 defined by walls 38 and 48 formed parallel with the axes of the pumping elements and arcuately curved to closely fit with the opposite peripheries of said pumping elements (see FIG. 8). Further, the flat sides of the pumping elements closely fit with the confining sides of the case sections 27, 29 and 31 (see FIG. 7).

With the pumping elements 35, 36, 45 and 46 operable in the case sections, as above described, fluid is moved in one direction through the chambers 37 and 47. Therefore, a suction passage 39 extends through the case sections to open into chamber 37 at the inlet side thereof, and a suction passage 49 extends through the case sections to open into chamber 47 at the inlet side thereof. Further, therefore, a discharge passage 50 extends through the case sections from the outlet side of the chamber 37, and a discharge passage 51 extends through the case sections from the outlet side of the chamber 47. The side passages 39 and 49, and 50 and 51 are offset and separate from each other, and they extend rearwardly and axially through the case to open into the valve chamber to be described.

A feature of the present invention is the provision of additional means in the fluid pumping means A and B that overcomes the ordinary fluid compression pocket pressure trapping generated by the intermeshing rolling contact of the gear teeth in the area between the intermeshing respective teeth addendums and dedendums. By the provision of a recess 52 at the addendum face of the tooth formation, from the outside diameter of the gear to a depth of about one-third the total depth of the tooth, fluid is permitted to bypass without formation of pressure pockets and without resistance to the rotation of the pumping elements that intermesh. As shown, the recesses are on one side of the teeth only. Since the means A and B revolve in one direction the teeth thereof have recesses on the discharge side thereof.

From the foregoing it will be apparent that the pumping means A and B circulate independent flows of fluid to and from the control means C, one at low volume and the other at high volume. The control means C is provided to direct the fluid medium for various purposes, to wit, for third speed control; for second speed control; for first speed control; for reverse braking control; for neutral control; for forward braking control; and for reverse control. The means C has a shiftable valve element that accomplishes the foregoing functional requirements, preferably a single rotatable valve element that is readily adapted to be selectively positioned. The means C controls the delivery of fluid flow through passages 50 and 51 and also from the above specified tubes 24 and 25. In accordance with the preferred form of the invention, the control means C involves a circular valve element 55 that is selectively positioned within a plenum 56 between opposed valve seat faces 57 and 58. The said valve element 55 is rotatably carried on a pin 59 extending between and supported by the case sections 31 and 32, and the spacer section 33 surrounds the valve element with substantial clearance establishing the plenum 56 and to position the faces 57 and 58 so that the valve element is free to be selectively positioned.

As best illustrated in FIG. 7, the seat faces 57 and 58 shown in FIGS. 22 and 21, respectively, are spaced and parallel and they are such as to slidably engage with flat opposite faces 60 and 61 of the valve element 55. In FIG. 34 of the drawings is shown the valve element 55 per se and which involves a disc-shaped body 62 and generally arcuate-shaped apertures 63 and 64 for the passage of fluid. The said apertures 63 and 64 are unique and of peculiar shape, and they govern the flow of fluid through the plenum 56 and to and from the passages 50 and 51, and tubings 24 and 25. The inlet passages 39 and 49 to the means A and B are positioned to open into the plenum 56 radially outward of the valve element 55, and in accordance with the invention the seat faces 57 and 58 are in the form of bosses of unique and peculiar shape, the plenum 56 being of substantially greater axial extent than the distance between said faces. Thus, there is ample freedom for the flow of fluid throughout the plenum 56 without restriction.

In accordance with the invention, the seat faces 57 and 58 are opposed and are mirror opposites of each other. Generally, the faces 57 and 58 have peripheries composed about three diameters (see FIG. 22), an inner diameter $a$, an intermediate diameter $b$, and an outer diameter $c$. The said inner diameter $a$ extends through an arc of about 25°. In looking forwardly at face 57 the periphery of the boss is defined by said intermediate diameter $b$ and extends clockwise about 75°, progressing radially outward from diameter $a$ and curved at 65 so as to merge with said diameter $b$, and from said diameter $b$ it progresses radially outward to the said outer diameter $c$. The said intermediate diameter $b$ also extends counter-clockwise about 60°, progressing radially outward from diameter $a$ and curved at 66 so as to merge with said diameter $b$, and from said diameter $b$ it progresses on a 45° bias relative to the radial at that point. As a result, the face 57, as well as face 58, is characterized and defined by a periphery having an inward step with a depression extending inwardly toward the center of the face.

The arcuate-shaped apertures 63 and 64 are curved to extend circumferentially and each is an opening that passes completely through the body 62. In the neutral position of the valve (see FIG. 31) the body portion 67 separating the two apertures overlies and is centered with the inner diameter $a$ of the seat faces 57 and 58. In looking forwardly at the back side of the valve 55, the aperture 63 extends clockwise about 145°, while the aperture 64 extends counter-clockwise about 140°. The valve element 55 is characterized by the configuration of the body 62 comprising axially disposed walls 68 and 69 that define the apertures 63 and 64, respectively, and by a reinforcing web 70, said walls and web being of relatively thin cross-section for fluid flow therearound.

The aperture 63 (see FIG. 34) comprises an inner portion 71 that overlies the area of the seat faces 57 and 58 between the said inner and intermediate diameters thereof, and a pair of outer portions 72 and 73 that overlie the area of the seat faces 57 and 58 between the said intermediate and outer diameters thereof. The outer portions 72 and 73 are of limited circumferential extent and each includes an arc of about 20°, said portion 73 being located at the clockwise extremity of the aperture 63, and said portions 72 and 73 being spaced about 50° circumferentially. The portions 71, 72, and 73 of the aperture are in open communication with each other, the latter two portions being radial extensions of the otherwise arcuate inner portion 71.

The aperture 64 (see FIG. 34) comprises an inner portion 74 and an outer portion 75 that overlie the respective inner and outer areas of the seat faces 57 and 58. Each of said portions 74 and 75 is arcuately formed concentric with the valve element 55 and they are in open communication with each other, the inner portion 74 being of about 65° circumferential extent, the outer portion 75 being of about 75° circumferential extent.

In accordance with the invention, the low volume discharge passage 50 and high volume discharge passage 51 open at ports 76 and 77, respectively, in the seat face 57. The low volume port 76 is of relatively small cross-sectional area and opens at the area of said seat face 57 between the said intermediate and outer diameters thereof. The high volume port 77 is of relatively large cross-sectional area and opens at the area of said seat face 57 between the said inner and intermediate diameters thereof. The two ports 76 and 77 are arcuate and each extends through an arc of about 20°, port 76 being positioned 155° counter-clockwise from the inner diameter $a$, and port 77 being positioned 180° from said diameter $a$.

In accordance with the invention, the seat face 58 is provided with ports 78 and 79 that are in communication with the tubes 24 and 25, respectively. In looking forwardly, and as shown in phantom lines in FIGS. 27 through 33, the port 78 is positioned about 70° counter-clockwise from the inner diameter $a$, and the two ports 78 and 79 are spaced 180° apart so that they are diametrically related to each other. The ports 78 and 79 occupy the area between the inner diameter $a$ and intermediate diameter $b$, and each is of a circumferential extent of about 45°.

From the foregoing the general and necessary arrangement of parts and elements will be apparent, particularly when considering FIGS. 21 through 34 of the drawings. As hereinabove specified, the control means C is operable through a sequence of positions, each position being effective to produce a specific function, as set forth and enumerated in the immediately following paragraphs:

(1) In FIG. 27 the third speed control position is shown wherein the fluid medium is drawn from the plenum 56 through passages 39 and 49 to be delivered by the means A and B through the discharge passages 50 and 51 at the ports 76 and 77. This position of the valve element 55 is the advanced clockwise position, with the two ports 76 and 77 discharging into the aperture 63, port 76 discharging into portion 73 and port 77 discharging into portion 71 of said aperture. As shown, the port 79 receives the full discharge of fluid through the aperture 63 which is conducted by the tube 25 and returned by the tube 24 to discharge into the plenum 56. Thus, maximum unrestricted flow of fluid is maintained.

(2) In FIG. 28 the second speed control position is shown wherein the fluid medium is drawn from the plenum 56 through passage 49 to be delivered by means B through the discharge passage 51 at the port 77. In this position the means A freely circulates fluid through the plenum 56 without work application. This position of the valve element 55 will be referred to as the second position counter-clockwise, with the port 77 discharging into the aperture 63. As shown, port 79 receives the high volume discharge of fluid through the aperture 63 which is conducted by tube 25 and returned by tube 24 to discharge into plenum 56. Thus, intermediate unrestricted flow of fluid is maintained.

(3) In FIG. 29, the first speed control position is shown wherein the fluid medium is drawn from the plenum 56 through passage 39 to be delivered by the means A through the discharge passage 50 at the port 76. In this position the means B freely circulates fluid through the plenum 56 without work application. This position of the valve element 55 will be referred to as the third position counterclockwise, with the port 76 discharging into the aperture 63. As shown, port 79 receives the low volume discharge of the fluid through the aperture 63 and which is conducted by tube 25 and returned by tube 24 to discharge into the plenum 56. Thus, low unrestricted flow of fluid is maintained.

(4) In FIG. 30, the reverse braking control position is shown wherein the means A and B freely circulate fluid through the plenum without work application. This position of the valve element 55 will be referred to as the fourth position counter-clockwise, with the port 79 discharging into the aperture 63, and wherein the fluid flow can be stopped or allowed to bypass into the plenum by further counter-clockwise movement of the valve element 55. Thus, infinitely variable restriction to the flow of fluid is obtained from the tube 25 and port 79.

(5) In FIG. 31, the neutral control position is shown wherein the means A and B freely circulate fluid through the plenum 56 without work application. This position of the valve element 55 will be referred to as the fifth position counter-clockwise, with the ports 78 and 79 in communication with the plenum 56 at the curved peripheral portions 65 and 66 of the seat faces 57 and 58. Thus, complete freedom of fluid flow is permitted through the plenum 56.

(6) In FIG. 32, the forward braking control position is shown wherein the means A and B freely circulate fluid through the plenum 56 without work application. This position of the valve element 55 will be referred to as the sixth position counter-clockwise, with the port 78 discharging into the aperture 64, and wherein the fluid flow can be stopped or allowed to by-pass into the plenum by further clockwise movement of the valve element 55. Thus, infinitely variable restriction of the flow of fluid is obtained from the tube 24 and port 78.

(7) In FIG. 33, the reverse control position is shown wherein the fluid medium is drawn from the plenum 56 through passage 39 to be delivered by the means A through the discharge passage 50 at the port 76. In this position the means B freely circulates fluid through the plenum 56 without work application. This position of the valve element 55 will be referred to as the seventh position counter-clockwise, with the port 76 discharging into the aperture 64. As shown, port 78 receives the low volume discharge of fluid through the aperture 64 which is conducted by tube 24 and returned by tube 25 to discharge into the plenum 56. Thus, low unrestricted flow of fluid is maintained reversely through the tubes 24 and 25.

Having described the general structure and operation of the transmission and control unit T attention is now directed to the driven unit D, shown in detail in FIGS. 15 through 20 of the drawings. The unit D as it is related to the unit T can vary widely, but it, too, is preferably a positive displacement type unit operable through the medium of fluid to drive and to be driven by the wheel to which it is attached. The unit D can be fixed in the vehicle frame structure with articulated drive axles, or as is preferred, it is fixed to the wheel 12 and to which it is rotatably coupled. The unit D is preferably a compact and integrated device in the form of a fluid operated motor and it involves a positive displacement motor means E housed in a sectional case 80. As shown, the case has spaced bearing sections 81 and 82 and a spacer section 83 therebetween. The sections can be made in any suitable manner and fabricated as circumstances require.

The motor means E is of the gear type having a drive element 84 and an idler element 85, each with intermeshing teeth. The drive element 84 is keyed to an axle shaft 86 that is directly coupled to the wheel 12 and which enters the case 80 through a fluid seal 87 in the case section 81. The fluid seal 87 comprises a packing about the axle shaft 86 and slidably engaged therewith to prevent fluid flow from within the case 80. The mating gear elements 84 and 85 are of the same diameter, the element 85 being rotatably carried by an idler shaft 88 offset from and parallel to the shaft 86. The shaft 86 is suitably journaled in bearings 89 while the shaft 88 is suitably journaled in bearings 90, said bearings being carried in aligned bores in the case sections 81 and 82, respectively. In order for the motor elements to operate for the purpose intended, they are operated within the closely fitted confines of a chamber 91 defined by walls formed parallel with the axes of the motor elements and arcuately curved to closely fit with the opposite peripheries of the said motor elements (see FIG. 19). Further, the flat sides of the motor elements closely fit with the confining sides of the case sections 81 and 82, as shown in FIG. 15.

With the motor elements 84 and 85 operable in the case 80, as above described, fluid is movable in either direction through the chamber 91 and therefore a passage 92 is extended through the case section 82 to open into one side 94 of the chamber 91, and a passage 93 is extended through the case section 82 to open into the other side 94' of the chamber 91. The said passages extend forwardly and, in practice, tubes 98 and 99 are coupled thereto, respectively.

A feature of the motor means E is the provision of means that overcomes the ordinary fluid compression pocket pressure trapping generated by the intermeshing rolling contact of the gear teeth in the area between the intermeshing respective teeth addendums and dedendums. As above described in connection with the means A and B, the means E is provided with a recess 110 at the addendum face of the tooth formation, from the outside diameter of the gear to a depth of about one-third the total depth of the tooth. The recess 110 permits the bypass of fluid without formation of pressure pockets and without resistance to the rotation of the motor elements that intermesh. As shown, the motor elements 84 and 85 are reversible in which case the recesses are provided on both the front and back sides of the teeth, to the end that there is a recess facing the area from the direction of rotation.

As hereinabove set forth, there are two independently operating driven units D, one at each side wheel 12 of the vehicle. As shown, the units D are tied together by means of a transverse bar 95 secured to each case 80 by means of a clamp 96. In carrying out the invention, the two pairs of tubes 98 and 99 converge as they extend forwardly and join together at Y-shaped members 100 and 101 from which the tubes 24 and 25 extend, respectively. The said tubes are rigid structural members fixed to the cases 80, and with the bar 95 an A-frame is formed with the apex thereof at the rear of the transmission and control unit T.

Referring now to the transmission and control unit T the coupling means K thereof involves a ball and socket swivel joint adapted to separately conduct the two fluid flows that are involved. As shown, the rearmost case section 32 has a concave socket 102 with the ports 78 and 79 opening therein. A ball 103 is rotatably held in the socket by a retainer 104 and is free to swivel therein, to a limited extent, there being a packing gland 105 to seal the coupling means. The tubes 24 and 25 are connected to the ball 103 with passages 106 and 107 extending through the ball to register with the ports 78 and 79, respectively. Thus, it will be apparent that mechanical thrust is applied through the coupling means K, allowing the tubes 98 and 99 to articulate with the up and down movement of the wheels 12.

In order to have selective manual control over the control positions hereinabove described a manually actuable means M is provided for positioning the valve element 55. The body 62 and/or web 70 thereof is extended and formed with gear teeth 115. A control shaft 116 enters radially through the spacer section 33, there being a packing gland at 117 and a pinion gear 118 at the inner end and within the plenum 56. The gear 118 meshes with the teeth 115 so that turning of the shaft 116 causes rotation of the valve element 55. The means M involves a valve position indicator 119 that involves a control column 120 turned by a manually engageable lever 121 that is positioned by a segment and detent means 122. The lower end of the column 120 is coupled to the shaft 116 by a pair of bevel gears 123 and the upper end of the column 120 is coupled to lever 121 operable through an arc of about 90°. The coupling between the column 120 and lever 121 is an over-riding coupling in order for the said column 120 to follow up to the position of said lever 121. Therefore, the column 120 and lever 121 are rotatable relative to each other, there being a stop 120' limiting counterclockwise rotation of the column 120 relative to the selectively positioned lever 121. A spring 121' normally yieldingly urges the column 120 into an advanced counterclockwise position against the stop 120'. The segment means 122 is stepped off in sequentially spaced detented position, seven in number and corresponding with the seven enumerated control positions. A spring biased detent element drops into the detent recesses that are provided, the two braking detent recesses being formed with steepened walls so as to prevent accidental movement of the lever 121 into the reverse and/or first positions.

In addition to the above, the control means M involves a foot pedal 125 adapted to position the lever 121 and valve element 55. The pedal 125 is carried on a reciprocable rod 126, there being a rack 127 on the said rod that is engaged with a gear 127' on the shaft 116 to rotate the same. By stepping upon the pedal 125 the shaft 116 is rotated to turn the column 120 and the valve element 55 to the forward braking position, there being a stop on the pedal (an adjustment screw). As clearly shown in FIG. 38 there is a lost motion or overtravel connection 125' allowing farther movement of the column 120 than the pedal 125. A spring 128, beneath the pedal 125, gives the necessary restriction to excessive braking, and the overtravel connection 125' is provided so that the lever 121 can turn the valve element 55 to the reverse position without further depression of the pedal 125.

Fluid is supplied to the transmission and control unit T from a supply tank 130 (see particularly FIGS. 3 and 10) located at any convenient position and disposed at an elevation above the unit T. Leading from the tank 130 is a fluid connection 131 and this connection has communication with a passage 133 that enters the spacer section 29 (see also FIGS. 4, 5 and 24) and which has communication with the chamber 37 in which the elements 35 and 36 operate. A ball valve 134 is provided in the passage 133 and which will open to permit the fluid to flow into the chamber 37, and to close in order to overcome back pressure. From the plenum 56 back to the tank 130 is a return connection 135, and in this connection is arranged a valve 136 shown in detail in FIG. 14. The tank 130 is provided with a fill opening 137 adapted to be closed by a suitable cap. A float 138 is arranged in the tank and operates a valve 139 which is connected with the float by means of a stem movable in suitable guides. The valve 139 is provided with a vent opening 140 and the float operates by the height of the fluid in the tank to open and close the valve 139 and thereby close the tank to the entrance of fluid after a predetermined amount of fluid has been placed in the tank, and also to insure a space within the tank to receive the fluid displaced from the system to take care of all overflow from the system. A froth inhibiting and/or foam seperating screen 141 occupies the tank at the normal fluid level, and processes the fluid as it circulates through the tank. Radiator tubes or pipes 141' pass through the tank and through the walls thereof so that air currents may be circulated therethrough and through the fluid, and out of commingling relation therewith, to cool the fluid in the tank.

The resistance valve 136 is placed in a combined pressure overflow and intake passage leading to a supply tank in order to provide a means for creating internal pressure within the fluid system upon the fluid being returned to the intake side of the pump elements and thereby providing a delivery of fluid under a predetermined pressure sufficient to fill the pockets within the teeth of the toothed elements completely, irrespective of high speed centrifugal force tending otherwise to prevent a full intake reception of the fluid being circulated. Further, this valve 136 maintains an operative fluid pressure in the plenum 56 so that no liquid will be discharged from the transmission unit sufficient to create vacuums within the system. The valve 136 is further provided as an additional means of intaking liquid in the event that any fluid action should take place which would cause an overdischarge of liquid from within the system, such as would occur in sudden braking or in throwing the power from forward to reverse. This valve can then act to augment, upon demand, the regular system cycling fluid supply and the constant extraneous supply tank inflow of the fluid to the driving gear elements.

The check valve 136 which is located in the pipe 135 (see FIGS. 10 and 14) is provided with a valve seat 142 with which a valve 143 cooperates and which valve is provided with openings 144 extending therethrough. One face of the valve 143 adjacent the seat is itself shaped to form a valve seat 145 separate from the valve seat 142 and the portion of the valve which cooperates with the seat 142. A supplemental valve 146 cooperates with the valve seat 145 to close the openings 144, and the valve 146 is adapted for movement with and with respect to the valve 143. The valve 146 is provided with a stem 147 which passes loosely through the valve 143 and extends therebeyond. A coil spring 148 encompasses the stem 147 beyond the valve 143 and one end of the spring rests against the valve 143 and the other rests against a collar 149 which encompasses the stem 47 within the valve 136, and abuts a pin 149' that passes through the stem 147. The stress of the spring 148 tends to seat the valve 146 upon the seat 145. The stem 147 also projects beyond the other face of the valve 146 and passes through a suitable guide for guiding the valve 146 in its action while the valve 143 is guided by and upon the valve stem 147.

The valve 136 casing is provided with a cap plug removably secured in position and is provided with an opening into which one end of a portion of the pipe 135 is threaded. A web or spider may be provided in the opening in the cap plug and through which spider the valve stem 147 passes.

Under normal conditions the fluid will be discharged into the tank 130 through the pipe 135 by unseating the valve 146 so that the fluid will flow through the openings 144. If there should be an abnormal discharge through the connection 135 into the tank 130, due to the application of the brakes of the vehicle, or from going from high speed to reverse, or from any other cause, thereby causing an over-discharge of fluid from the system into the tank 130, and at which period the prime mover should be actuating slowly, a condition of partial vacuum would be created in the system which would prevent effective operation of the brakes and which would further cause a slow recovery of a full volume of driving fluid necessary to operate the driven elements if depending upon restoring full volume of fluid from the constant intake supply through the pipe connection 131 to the fluid circulating elements. When such a condition exists in the system and by the use of the valve 136, the valve 143 will be freely opened by the vacuum created in the system, to permit the necessary supply of fluid to be drawn into the system from the tank 130 through the conection 135, thereby converting said connection by this action into a supply or inlet pipe for additional fluid to be supplied to the valve plenum 56. With this improved construction there will be created a continuous open-loop circulation of fluid through the system by constantly introducing fluid from the supply tank through connection 131, which constant intake requires an equivalent amount of discharge back into the supply tank through connection 135. The fluid circulating back into the tank 136 will be maintained cooled, and additionally the tank 130 providing a means whereby the compressible air and/or gas which may be formed from the action of the fluid is filter-separated from the fluid.

The prime mover P is initially started by the fluid delivered from a closed starter tank 150 (see particularly FIGS. 3, 10 and 13), which tank is provided with an opening 151 in the bottom thereof, and which opening constitutes both an inlet and an outlet for the fluid to and from the tank 150. The opening 151 is controlled by a valve 152 (see particularly FIG. 13) and in which valve is a second or supplemental valve 153 operating in opposition to the valve 152. The valve 152 is adapted to be seated by a spring 154 and a spring 155 is provided for controlling the operation of the valve 153. Leading from the valves 152-153 is a connection 156 which constitutes both an inlet and an outlet for the starter tank 150 and which communicates with the chamber 37 (see also FIGS. 11 and 24) in which the fluid circulation elements 35 and 36 are arranged and through a passage 157 in the case section 33. A ball valve 158 is provided for closing the passage 157 when the pressure in the starter tank 150 has reached a predetermined degree, and the starter button to be hereinafter described, is released.

The valves 134 and 158 in the several supply passage 131, 133 and 157 control said passages and maintain the fluid introduced through the passage 133 against escape into the supply passages 131 and 157, so that the liquid will be caused to exert its pressure to actuate the driving elements 35 and 36. The tank 150 is provided with a supply of gas, and which quantity of gas is of an initial predetermined degree of pressure and may be supplied through a suitable valve controlled opening 159. The gas in the tank 150 being under an initial predetermined degree of pressure will be further compressed by the fluid from the transmission admitted into the tank 150 by means of the fact that the fluid flowing into said tank from the pipe 156 will unseat the valve 153, the valve 152 being maintained seated by the spring 154 and the pressure in the system. The passage 157 has communication with the passage 133 by means of a passage 160 having a ball valve 161 for controlling the passage. A rod 162 is adapted to engage the valve 161 to unseat the latter, this valve being held on its seat by the pressure of the fluid, and the stem 162 is of a diameter less than the diameter of the opening through which it passes to engage the valve 161 so that when the valve 161 is unseated fluid may flow around the stem or rod 162 between the passages 156 and 133. The rod 162 is adapted to be depressed by means of a lever 163 having a cam-shaped portion 164 adapted to engage the end of the rod 162. This lever is connected by means of a rod 165 to a starter button arranged in a convenient position for the operator so that when the starter button is depressed the cam 164 will actuate the rod 162 to unseat the valve 161 permitting the fluid to flow through the connection 156, passageway 160, into the passage 133, closing a check valve 167 in passage 39 to means A (see FIG. 4) and into the chamber 37 against the elements 35 and 36 to actuate or drive the latter by reason of the gas pressure in the tank 150 operating upon the fluid.

The initial pressure of the gas in the starter tank 150 is such that all of the fluid can be expelled from the tank whereupon the valves 152-153 will operate to trap or retain the gas in the tank, the valve 152 being set to close an initial predetermined pressure. The tank 130 receives the fluid displaced from the starter tank as the fluid in the starter tank is discharged through the fluid driving elements 35 and 36, and vice versa. The prime mover P becomes operable, signaling the manual release of starter button 166, thereby preventing any further discharge of fluid from the starter tank 150. The prime mover actuated elements 35 and 36 then recharge the starter tank 150 to a predetermined pressure when the valve element 55 is positioned in first speed ratio or reverse position.

Passages 167 and 168 (see particularly FIGS. 7 and 25) are provided between the plenum 56 and the passages 78 and 79, and check valves 169 and 170 are provided in these passages for controlling the same. The passages and valves provide for free wheeling and are provided as a means for overcoming any vacuum that may form in the system by allowing fluid to flow from the plenum 56 into either tube 24 or 25 in order to satisfy upon demand any fluid starvation that may exist. This provision is made in order to prevent the fluid from being cut off from any of the driven elements by reason of operation of the valve element 55, which would otherwise cause these elements to discharge their fluid and thereby create a vacuum.

Coasting or free-wheeling fluid circulation is possible to conserve the momentum energy of the vehicle without being resisted by the prime mover. It is the provision of the check valves 169 and 170 that inherently function to allow free suction of fluid from the plenum 56 if and when the driven units D are turned so as to demand more fluid than is being delivered, then there is free turning of the wheels 12. In FIG. 7 it will be apparent how free-wheeling can occur when moving in either direction, each passage 78 and 79 being in communication with the plenum 56 through the check valves 169 and 170, respectively.

The relief pressure valve 171 shown in FIG. 5 embodies a casing having a valve seat 172 with which the ball valve 171 cooperates. A valve engaging member 173 contacts with the ball 171 and interposed between the member 173 and a cap or plug 174 is a spring 175, one end of which contacts with the member 173 and the other end contacts with a member 174, which is provided with a portion 177 that telescopes through a suitable packing to provide a fluid tight joint. The stress of the spring 175 can be varied, which provides excess pressure relieving for chamber 47, in which elements 45 and 46 operate when the valve element 55 is positioned in second position, returning the overflow through a passage 178 to plenum 56.

A pair of similar pressure relief valves 179 and 180 are provided for relieving the excess pressure from the ports 78 and 79 to the plenum 56 having the dual function of preventing pressure overloads from developing in the system when the valve element 55 is positioned for both forward and reverse braking, respectively, and for overload (see FIG. 30).

A similar pressure relief valve 181 is provided for relieving the excess pressure in the chamber 37 in which the elements 35 and 36 operate when the valve element 55 is positioned in reverse, returning the pressure overflow into the chamber or plenum 56. The pressure relief valve 181 has the dual function of preventing pressure overloads from developing in the system when the valve 55 is positioned for forward braking (see FIG. 32). This valve 181 is provided for relieving excess pressure of the entire system when the valve element 55 is positioned for high position, controlling the excess pressure relief passage 183 which opens through the seat 57, discharging the overflow through passage 183 into the plenum 56 (see FIG. 21).

An equalizing relief valve 185 (see FIGS. 15 and 18) prevents excessive pressure from developing within the system from sudden power reversal when the valve element 55 is suddenly re-positioned from high position to reverse position, or vice-versa, causing the reverse driving fluid to be thrust against the column of fluid being returned by the inertia propelled driven elements of the motor unit D and consequently creating substantial pressure in the system in excess of that which pressure relief valve 181 can readily dispose of. The sudden pressure build-up which is exerting a braking action upon motor elements will be short-circuited from passage through passageway 186 by the opening of relief valve 185. This short-circuited fluid displacement from one line of fluid circulation passages to the other overcomes the excessive pressure in the high pressure fluid driving passages and also provides auxiliary means to overcome the fluid starvation that would tend to occur in the opposed fluid return passages which were suddenly transformed from a fluid delivery drive line to a transitional line whose subsequent function of receiving the return fluid flow from the reverse position rotation of the driven elements 65–66 has been delayed until the forward inertia of the vehicle has been arrested. Excessive pressures are thus averted and fluid starvation is overcome while the vehicle's forward motion is arrested more rapidly than with forward braking positioning of the valve 55, yet without shock or unseating of the occupants of the vehicle, followed by the reverse speed backing up of the vehicle.

Summarizing the various pressure relief valves heretofore described, they provide means for safely removing excessive pressures that may develop in the fluid system such as for sudden reversal of power, whether intentional or unintentional, regardless of what speed the system may be operating and also for the fluid action braking system, providing freedom from shock with a cushioned, resilient action. The relief valves also limit the pressure of each respective fluid system circuit or the combined accumulative pressure of all the circuits to the operable torque of the prime mover, which prevents the prime mover from stalling from any system overload, even if the vehicle were pushing against an immovable object.

It will be apparent that a central control unit is operated by a single valve element and that a selection of pressure-volume ratios and power application changes may be obtained, including a reverse direction pressure-volume ratio. A pressure-volume ratio may be changed successively to another selected ratio by manual selection and furthermore a braking operation of the fluid may be obtained in either direction of flow of the fluid by adjusting the position of the valve. This is accomplished without shifting of gears and without producing shock to the various parts or without any substantial interruption of the fluid driving continuity such as is caused by torque lapse.

The valve chamber or plenum being manifold in its function, is hereby summarized. The plenum is integrated functionally into a power control center, containing the valve element 55. In the present invention the plenum is intermediate the driving and driven element comprising a pressurized intercommunicating chamber which is accessible to receive or discharge circulating fluid to provide for manifold functions, to wit: the reception of overflow from the various pressure relief valves which operate and intercommunicate at all speeds; the return intake into the driving elements, providing pressure fed or supercharged fluid induction into the driving elements, increasing their volumetric efficiency; the neutral coasting cycle flow of fluid from the driven elements return passages, by-passing the driving elements and cycling into the driven element supply passages; all of said functions being accomplished in conjunction with the single valve 55 which further acts to bring into and out of communication the driving and driven elements and to cooperatively receive and discharge fluid through its inter-communication with the plenum 56.

The fluid column pressure maintained by the extraneous induction of fluid into the driving elements provides the system with a fluid oversupply which discharges through the plenum pressure overflow, making the discharged fluid available for foam and gas bubble removal in the supply tank, while the internal plenum pressure resistance prevents the system from being partially emptied under sudden manipulation of the control, thereby preventing vacuums from being created which make the transmission of fluid power unavailable. This also prevents the admission of air from around extraneous projecting shafts, thus obviating the common failure in fluid drives which causes an emulsification of the fluid medium, etc.

Traction of the rear wheels 12 (see FIG. 2) is thrust vectored to the encased transmission and control unit T, the mass of which is structurally combined with the prime mover P, the combination of which is located forward of the vehicle's "pivotal" or vertical axis, and connected by dual fluid delivery and return passage swiveling radius rod tubes, which fluid communicates the encased independent driven drive units D. Thrust inertia is transmitted and applied to the forward located principal mass, substantially elminating unbalanced, pivot-like forces caused by mass inertia from the rear.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A multiple pump unit and control assembly adapted to be driven by a prime mover, and including, a case with a plenum therein having opposed seat faces, a low volume port and a high volume port in the case and opening into the plenum at one seat face and in communication with low and high volume pumps respectively, a suction passage from each of said pumps and opening into the plenum, said pumps having driving connection with the prime mover, a pair of flow tubes opening into the plenum at the other seat face to receive the pump flow, and a valve element rotatable between said seat faces and through a plurality of positions controlling flow to a point of use and selectively to a position whereby flow is from the plenum and through both pumps and from both ports to enter through an aperture in the valve element and then through one tube to re-enter the plenum through the other tube.

2. A multiple pump unit and control assembly adapted to be driven by a prime mover, and including, a case with a plenum therein having opposed seat faces, a low volume port and a high volume port in the case and opening into the plenum at one seat face and in communication with low and high volume pumps respectively, a suction passage from each of said pumps and opening into the plenum, said pumps having driving connection with the prime mover, a pair of flow tubes opening into the plenum at the other seat faces to receive the pump flow, and valve element rotatable between said seat faces and through a plurality of positions controlling flow to a point of use and selectively to a position whereby flow is from the plenum and through one of said pumps and respective port to enter through an aperture in the valve element and then through the tube to re-enter the plenum through the other tube.

3. A multiple pump unit and control assembly adapted to be driven by a prime mover, and including, a case with a plenum therein having opposed seat faces, a low volume port and a high volume port in the case and opening into the plenum at one seat face and in communication with low and high volume pumps respectively, a suction passage from each of said pumps and opening into the plenum, said pumps having driving connection with the prime mover, a pair of flow tubes opening into the plenum at the other seat face to receive the pump flow, and a valve element rotatable between said seat faces and through a plurality of positions controlling flow to a point of use and variably positioned whereby flow is freely circulated through the plenum from both pumps and an aperture in the valve element whereby flow returning from one of said tubes enters into the plenum for controlled discharge.

4. A multiple pump unit and control assembly adapted to be driven by a prime mover, and including, a case with a plenum therein having opposed seat faces, a low volume port and a high volume port in the case and opening into the plenum at one seat face and in communication with low and high volume pumps respectively, a suction passage from each of said pumps and opening into the plenum, said pumps having driving connection with the prime mover, a pair of flow tubes opening into the plenum at the other seat face to receive the pump flow, and a valve element rotatable between said seat faces and through a plurality of positions controlling flow to a point of use and to a position with ports whereby flow is freely circulated through the plenum from both pumps and from both tubes.

5. A multiple pump unit and control assembly adapted to be driven by a prime mover, and including, a case with a plenum therein having concentrically opposed seat faces, a low volume port and a high volume port circumferentially and radially spaced in the case to open into the plenum at one seat face and in communication with low and high volume pumps respectively, a suction passage from each of said pumps and opening into the plenum outward of said seat faces, said pumps having driving connection with the prime mover, a pair of circumferentially spaced flow tubes opening into the plenum at the other seat face to receive the pump flow, and a rotatable valve element engaged between said faces for selectively controlling flow to a point of use and having an arcuate aperture adapted to conduct flow between said faces.

6. A multiple pump unit and control assembly adapted to be driven by a prime mover, and including, a case with a plenum therein having concentrically opposed seat faces, a low volume port and a high volume port circumferentially and radially spaced in the case to open into the plenum at one seat face and in communication with low and high volume pumps respectively, a suction passage from each of said pumps and opening into the plenum outward of said seat faces, said pumps having driving connection with the prime mover, a pair of circumferentially spaced flow tubes opening into the plenum at the other seat face to receive the pump flow, and a rotatable valve element engaged between said faces for selectively controlling flow to a point of use and having an arcuate aperture with inner and outer interconnected portions adapted to conduct flow from said ports respectively and between said faces.

7. A multiple pump unit and control assembly adapted to be driven by a prime mover, and including, a case with a plenum therein having concentrically opposed seat faces, a low volume port and a high volume port circumferentially and radially spaced in the case to open into the plenum at one seat face and in communication with low and high volume pumps respectively, a suction passage from each of said pumps and opening into the plenum outward of said seat faces, said pumps having driving conneciton with the prime mover, a pair of circumferentially spaced flow tubes opening into the plenum at the other seat face to receive the pump flow, and a rotatable valve element engaged between said faces for selectively controlling flow to a point of use and having an arcuate aperture with inner and spaced outer interconnected portions adapted to conduct flow from said ports respectively and between said faces.

8. A multiple pump unit and control assembly adapted to be driven by a prime mover, and including, a case with a plenum therein having concentrically opposed seat faces, a low volume port and a high volume port circumferentially and radially spaced in the case to open into the plenum at one seat face and in communication with low and high volume pumps respectively, a suction passage from each of said pumps and opening into the plenum outward of said seat faces, said pumps having driving connection with the prime mover, a pair of circumferentially spaced flow tubes opening into the plenum at the other seat face to receive the pump flow, and a rotatable valve element engaged between said faces for selectively controlling flow to a point of use and having a pair of oppositely and circumferentially extending apertures adapted to conduct flow between said faces.

9. A multiple pump unit and control assembly adapted to be driven by a prime mover, and including, a case with a plenum therein having concentrically opposed seat faces, a low volume port and a high volume port circumferentially and radially spaced in the case to open into the plenum at one seat face and in communication with low and high volume pumps respectively, a suction passage from each of said pumps and opening into the plenum outward of said seat faces, said pumps having driving connection with the prime mover, a pair of circumferentially spaced flow tubes opening into the plenum at the other seat face to receive the pump flow, and a rotatable valve element engaged between said faces for selectively controlling flow to a point of use and having a pair of oppositely and circumferentially extending apertures adapted to conduct flow between said faces, said apertures having spaced inner and outer interconnecting portions adapted to conduct flow from said ports respectively.

10. A multiple pump unit and control assembly adapted to be driven by a prime mover, and including, a case with a plenum therein having concentrically opposed seat faces with aligned inwardly stepped peripheries, a low volume port and a high volume port circumferentially and radially spaced in the case to open into the plenum at one seat face and in communication with low and high volume pumps respectively, a suction passage from each of said pumps and opening into the plenum outward of said seat faces, said pumps having driving connection with the prime mover, a pair of circumferentially spaced flow tubes opening into the plenum at the other seat face to receive the pump flow, a rotatable valve element engaged between said faces for selectively controlling flow to a point of use and having an arcuate aperture with inner and outer interconnected portions adapted to conduct flow between said faces and said outer portion of said aperture opening into said step.

11. A multiple pump unit and control assembly adapted to be driven by a prime mover, and including, a case with a plenum therein having concentrically opposed seat faces with aligned inwardly stepped peripheries, a low volume port and a high volume port circumferentially and radially spaced in the case to open into the plenum at one seat face and in communication with low and high volume pumps respectively, a suction passage from each of said pumps and opening into the plenum outward of said seat faces, said pumps having driving connection with the prime mover, a pair of circumferentially spaced flow tubes opening into the plenum at the other seat face to receive the pump flow, and a rotatable valve element engaged between said faces for selectively controlling flow to a point of use and having a pair of oppositely and circumferentially extending apertures with inner and outer interconnected portions adapted to conduct flow between said faces and said outer portions of said apertures opening into said steps.

12. A multiple pump unit and control assembly adapted to be driven by a prime mover, and including, a case with a plenum therein having concentrically opposed seat faces with aligned inwardly extending recesses, a low volume port and a high volume port circumferentially and radially spaced in the case to open into the plenum at one seat face and in communication with low and high volume pumps respectively, a suction passage from each of said pumps and opening into the plenum outward of said seat faces, said pumps having driving connection with the prime mover, a pair of circumferentially spaced flow tubes opening into the plenum at the other seat face to receive the pump flow, and a rotatable valve element engaged between said faces for selectively controlling flow to a point of use and having a pair of oppositely and circumferentially extending apertures with inner and outer interconnected portions adapted to conduct flow between said faces and said outer portions of said apertures opening into said recesses.

13. A fluid pumping and control assembly adapted to be driven by a prime mover, and including, a low volume pump and a high volume pump having driving connection with the prime mover, control means selectively operable to govern the quantity and direction of flow of said pumps, and a fluid supply tank with a fluid connection to said pumps, flow through said connection being free in a direction toward said pumps and yieldingly restricted in the opposite direction.

14. A fluid pumping and control assembly adapted to be driven by a prime mover, and including, a case with a plenum therein, a low volume pump and a high volume pump having driving connection with the prime mover, said pumps circulating flow through passages opening into the plenum, control means comprising a valve element shiftable in the plenum to cooperate with said passages opening therein to selectively govern the quantity and direction of flow of said pumps, a fluid supply tank with a fluid connection to the plenum, and a fluid connection to the inlet of a pump, flow through said first mentioned connection being free in a direction toward said pump and yieldingly restricted in the opposite direction, and flow through said second mentioned connection being free in a direction toward said pump and checked in the opposite direction.

15. A fluid pumping and control assembly adapted to be driven by a prime mover, and including, a case with a plenum therein, a low volume pump and a high volume pump having driving connection with the prime mover, said pumps circulating flow through passages opening into the plenum, control means comprising a valve element shiftable in the plenum to cooperate with said passages opening therein to selectively govern the quantity and direction of flow of said pumps, and a pressure charged fluid reservoir with a valve controlled fluid connection to the inlet of one pump, and a check valve limiting flow in a passage from the plenum to the inlet of said pump.

16. A fluid pumping and control assembly adapted to be driven by a prime mover, and including, a case with a plenum therein, a low volume pump and a high volume pump having driving connection with the prime mover, said pumps circulating flow through passages opening into the plenum, control means comprising a valve element shiftable in the plenum to cooperate with said passages opening therein to selectively govern the quantity and direction of flow of said pumps, and a pressure charged fluid reservoir with a manually operable valve controlled fluid connection to the inlet of one pump, a check valve in a passage communicating with the outlet of the other pump and opening into the first mentioned connection, and a check valve limiting flow in an inlet passage from the plenum to the said one pump.

17. A fluid pumping and control assembly adapted to be driven by a prime mover, and including, a case with a plenum therein, a low volume pump and a high volume pump having driving connection with the prime mover, said pumps circulating flow through passages opening into the plenum, control means comprising a valve element shiftable in the plenum to cooperate with said passages opening therein to selectively govern the quantity and direction of flow of said pumps, a chargeable pressure fluid reservoir with a prestressed closing valve in a passage communicating with said pumps and to shut at a predetermined pressure, and a check valve for entry of a charge therein.

18. A fluid pumping and control assembly adapted to be driven by a prime mover, and including, a case with a plenum therein, a low volume pump and a high volume pump having driving connection with the prime mover, said pumps circulating flow through passages opening into the plenum, control means comprising a valve element shiftable in the plenum to cooperate with said passages opening therein to selectively govern the quantity and direction of flow of said pumps, and a chargeable pressure fluid reservoir with a prestressed closing valve in a passage communicating with said pumps and to shut at a predetermined pressure and a check valve in parallel with the closing valve to pass fluid into the reservoir.

19. A fluid pumping and control assembly adapted to be driven by a prime mover, and including, a case with a plenum therein, a low volume pump and a high volume pump having driving connection with the prime mover, said pumps circulating flow through passages opening into the plenum, control means comprising a valve element shiftable in the plenum to cooperate with said passages opening therein to selectively govern the quantity and direction of flow of said pumps, and a pressure relief valve in the discharge passage of the high volume pump and discharging into the plenum.

20. A fluid pumping and control assembly adapted to be driven by a prime mover, and including, a case with a plenum therein, a low volume pump and a high volume pump having driving connection with the prime mover, said pumps circulating flow through passages opening into the plenum, a pair of flow tubes opening into the plenum to receive the pump flow, control means comprising a valve element shiftable in the plenum to cooperate with said passages and said flow tubes opening therein to selectively govern the quantity and direction of flow of said pumps, and a pressure relief valve in one of said flow tubes and discharging into the plenum.

21. A fluid pumping and control assembly adapted to be driven by a prime mover, and including, a case with a plenum therein, a low volume pump and a high volume pump having driving connection with the prime mover, said pumps circulating flow through passages opening into the plenum, a pair of flow tubes opening into the plenum to receive the pump flow, control means comprising a valve element shiftable in the plenum to cooperate with said passages and said flow tubes opening therein to selectively govern the quantity and direction of flow of said pumps, and a pressure relief valve in each flow tube and discharging into the plenum.

References Cited by the Examiner
UNITED STATES PATENTS

| | | | |
|---|---|---|---|
| 961,372 | 6/10 | Rockwell | 180—66 |
| 1,126,812 | 2/15 | McQueen | 60—53 |
| 1,285,819 | 11/18 | Smith | 103—126 |
| 1,426,902 | 8/22 | Noel et al. | 180—66 |
| 1,835,978 | 12/31 | Ernst | 60—52 |
| 2,042,247 | 5/36 | Blood | 103—11 |
| 2,103,530 | 12/37 | Henry | 60—52 |
| 2,276,895 | 3/42 | Vossler et al. | 103—11 |
| 2,280,392 | 4/42 | Herman et al. | 103—11 |
| 2,362,389 | 11/44 | Martin | 60—53 |
| 2,601,003 | 6/52 | Pontius | 103—126 |
| 2,601,004 | 6/52 | Cintron | 103—126 |
| 2,671,403 | 3/54 | Peters et al. | 103—11 |
| 2,791,284 | 5/57 | Jackson | 60—53 |
| 2,839,889 | 6/58 | McGill | 103—11 |
| 2,917,897 | 12/59 | Shaffer | 60—53 |
| 2,954,834 | 10/60 | Hammar | 180—66 |
| 3,006,140 | 10/61 | Dmitroff | 60—18 |

FOREIGN PATENTS

| | | |
|---|---|---|
| 833,635 | 7/38 | France. |
| 636,781 | 5/50 | Great Britain. |

LAURENCE V. EFNER, *Primary Examiner.*

PHILIP ARNOLD, *Examiner.*